United States Patent
Chai et al.

(10) Patent No.: US 11,370,680 B2
(45) Date of Patent: Jun. 28, 2022

(54) METHOD FOR ENHANCING BIOCHEMICAL WATER TREATMENT BY POWDER CARRIER

(71) Applicant: Tongji University, Shanghai (CN)

(72) Inventors: Xiaoli Chai, Shanghai (CN); Xiaohu Dai, Shanghai (CN); Bin Lu, Shanghai (CN); Boran Wu, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 51 days.

(21) Appl. No.: 17/029,080

(22) Filed: Sep. 23, 2020

(65) Prior Publication Data

US 2021/0147268 A1  May 20, 2021

(30) Foreign Application Priority Data

Nov. 19, 2019  (CN) .......................... 201911131996.9

(51) Int. Cl.
  *C02F 3/10*  (2006.01)
  *C02F 1/66*  (2006.01)
  *C02F 3/12*  (2006.01)
  *C02F 1/00*  (2006.01)
  *C02F 3/00*  (2006.01)

(52) U.S. Cl.
  CPC .............. *C02F 3/104* (2013.01); *C02F 1/66* (2013.01); *C02F 3/106* (2013.01); *C02F 3/107* (2013.01); *C02F 3/1284* (2013.01); *C02F 2001/007* (2013.01); *C02F 2003/003* (2013.01); *C02F 2203/004* (2013.01); *C02F 2303/22* (2013.01)

(58) Field of Classification Search
  CPC .. C02F 3/104; C02F 1/66; C02F 3/106; C02F 3/107; C02F 3/1284; C02F 2001/007; C02F 2003/003; C02F 2203/004; C02F 2303/22; C02F 3/10
  See application file for complete search history.

(56) References Cited

U.S. PATENT DOCUMENTS

| 4,186,085 A * | 1/1980 | Savage | C02F 1/26 210/669 |
| 5,932,099 A * | 8/1999 | Cote | C02F 3/10 210/605 |
| 2006/0000771 A1 * | 1/2006 | Gaid | C02F 9/00 210/616 |

* cited by examiner

*Primary Examiner* — Claire A Norris
(74) *Attorney, Agent, or Firm* — Bayramoglu Law Offices LLC

(57) ABSTRACT

A method for enhancing biochemical water treatment by a powder carrier includes: (i) screening the powder carrier by removing impurities to obtain a screened powder carrier; (ii) dissolving the screened powder carrier by stirring to prepare a slurry, enabling the screened powder carrier to completely absorb moisture to obtain a soaked powder carrier slurry; (iii) adjusting the pH value and adding the soaked powder carrier slurry into a bioreactor or a biological reaction structure; (iv) distributing the soaked powder carrier slurry uniformly through a hydraulic agitation; (v) loading a microorganism on the inner pore and wrapping on the surface of the soaked powder carrier slurry to obtain powder-loaded biological floccules; (vi) settling the powder-loaded biological floccules in a sedimentation zone and separating the powder carrier from the microorganism for reuse.

18 Claims, 1 Drawing Sheet

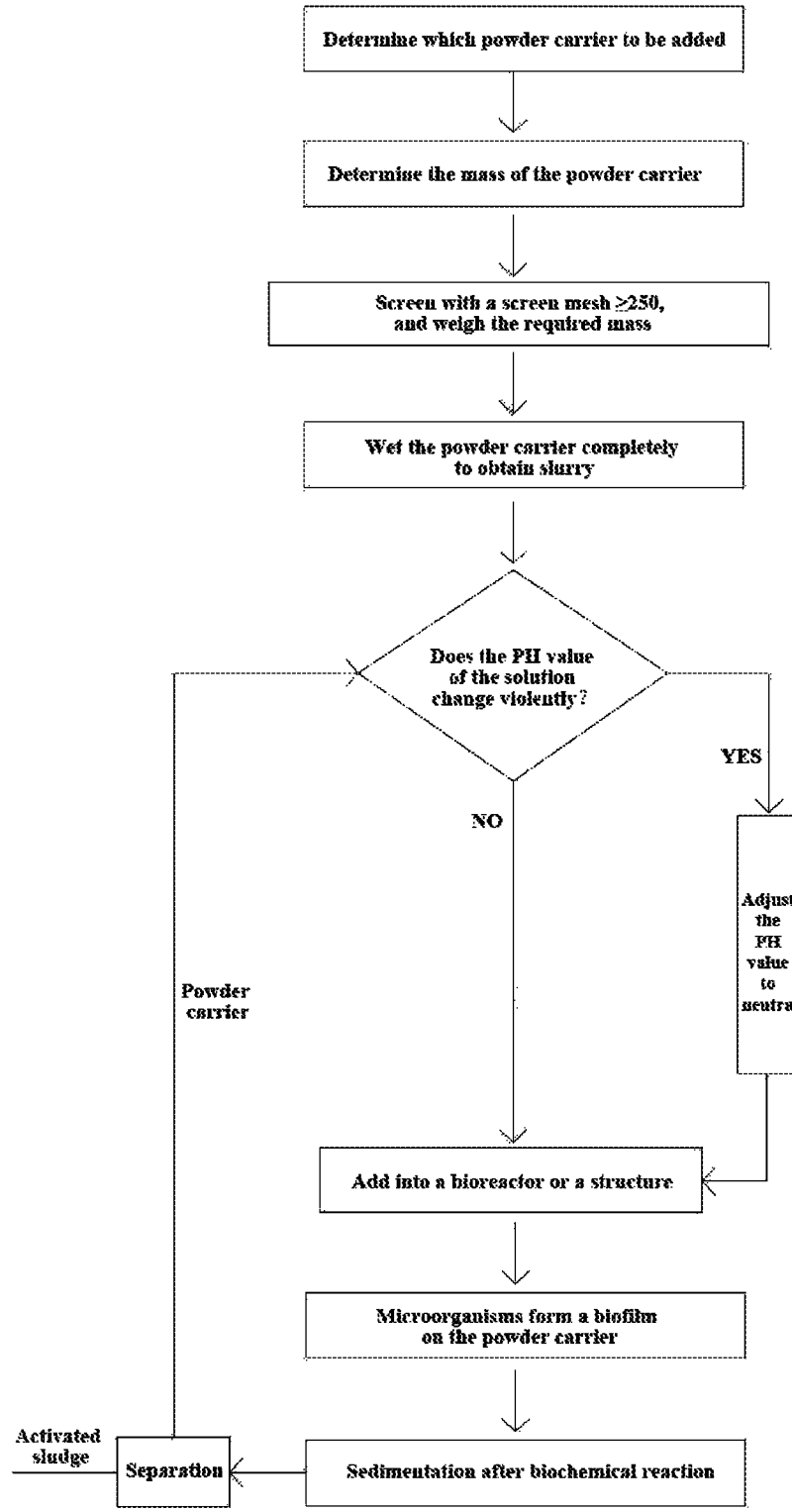

METHOD FOR ENHANCING BIOCHEMICAL WATER TREATMENT BY POWDER CARRIER

CROSS REFERENCE TO THE RELATED APPLICATIONS

This application is based upon and claims priority to Chinese Patent Application No. 201911131996.9, filed on Nov. 19, 2019, the entire contents of which are incorporated herein by reference.

TECHNICAL FIELD

The present invention relates to the technical field of microbial biochemical treatment, and in particular to a method for enhancing biochemical water treatment by a powder carrier, which is used for biochemical treatment of various wastewater.

BACKGROUND

As industries and agriculture farms develop rapidly, domestic wastewater increases sharply, there is a need to treat the wastewater that contain an increasing amount and various kinds of pollutants. Due to the backward construction of pipe network in China, there remains a part of wastewater that has not been intercepted. Putting this wastewater into a wastewater plant as untreated will increase the operation pressure of the wastewater plant. With the deterioration of environment and people's increasing attention to the living environment, the discharge standard of the wastewater plant continues to raise. However, the limited design load of the wastewater plant makes it nearly impossible to receive excessive amount of external wastewater, there is a need to expand or build additional wastewater treatment facilities to meet the increasing demand. However, due to China's large population and shortage of urban land resources, putting more lands into building or expanding wastewater treatment facilities is not feasible as it would increase initial investment and construction costs. Therefore, developing technologies to improve wastewater treatment capacity of the original wastewater treatment facility without changing the facility structures is highly desired. China's population is widely distributed, and if the pollution sources are connected to the network together, it will be high-cost and non-economic. Therefore, an efficient treatment technology is urgently needed to miniaturize make the treatment facilities miniaturized. Under a certain effective volume, an efficient treatment can be carried out, so as to reduce the occupation of land resources. There are many powders with extremely small particle size and large specific surface area in natural environment, and China is especially rich in these powders. Experiment results have shown that certain powders, due to their small pore size and large specific surface area, are suitable for microorganisms to attach, and can enhance the concentration of the microorganisms, increase the sedimentation capacity of the microorganisms, and improve the sludge quantity as well as the effluent quality in the wastewater treatment equipment. Objectively, a high-efficiency, pollution-free and highly-applicable biochemical process for wastewater treatment process is required to be developed.

SUMMARY

An objective of the present invention is to provide a method for enhancing biochemical water treatment by a powder carrier, which has the advantages of being high-efficiency, pollution-free, highly applicable, etc.

A method for enhancing biochemical water treatment by a powder carrier includes the following steps:

(1) selecting a certain amount of powder carrier to be added, removing impurities with a large particle size by a screen to obtain a screened powder carrier;

(2) adding a solvent into the screened powder carrier, dissolving the screened powder carrier by stirring to prepare a slurry, enabling the screened powder carrier to completely absorb moisture and not to float upwards in lumps to obtain a soaked powder carrier slurry;

(3) adjusting the pH value of the soaked powder carrier slurry to be neutral, and adding the soaked powder carrier slurry into a bioreactor or a biological reaction structure;

(4) distributing the soaked powder carrier slurry uniformly in the bioreactor through various hydraulic agitations, due to part of the powder carrier has good sedimentation performance, continuous stirring is needed to make the slurry uniformly distributed;

(5) loading microorganisms in the bioreactor on an inner pore of the powder carrier and wrapping on the surface of the powder carrier by adhesion, i.e., attaching a biofilm to the surface of the powder carrier to form biological floccules with nucleus sedimentation, a large amount of the biological floccules form powder particles loaded with the microorganism through the flocculation and adsorption activity of the microorganisms to obtain powder-loaded biological floccules;

(6) settling the powder-loaded biological floccules in a sedimentation zone after passing through the biological reaction zone and separating the powder carrier from the microorganisms by a separator for reuse.

Further, in step (1), the powder carrier is at least two selected from the group consisting of diatomite, powdered activated carbon, zeolite powder, volcanic rock powder, talc powder and fly ash.

Further, in step (1), the screen used for screening is more than 200 mesh, or the powder carrier with a particle size of 10-74 μm is directly used. The advantages are to avoid the problems such as too fast sedimentation speed after microorganism loading, poor fluidity after sedimentation, and too small surface area for the microorganism loading caused by too large particle size of powder particles. Not only the contact surface area between the powder carrier and the microorganisms can be increased, but the sedimentation performance can be improved.

Further, an inner surface area of the powder carrier is 30-70 $m^2/g$, a loss on ignition is 0-40%, and a bulk density is 0.1-1.0 $g/m^3$.

Further, in step (2), the solvent is water or wastewater, and the solvent is only used for dissolving the powder carrier. An adding amount of the solvent is not fixed, as long as the powder carrier is completely wetted.

Further, in step (3), the pH value of the soaked powder carrier slurry is adjusted by slowly replacing a supernatant of the slurry, or by chemical substances such as acid, alkali and salt.

Further, in step (3), a method of adding the slurry is as follows: after stirring the slurry by an agitation vat, adding diluted and wetted slurry into a biochemical tank by a directional spraying device, or after stirring and wetting the powder carrier by the agitation vat, adding the slurry into the biochemical tank at a regular time and in a regular position by a dry throwing machine.

Further, in step (3), after adding, a concentration of the powder carrier in the biological reaction structure is 2 g/L-20 g/L. The advantage is to increase a concentration of the powder carrier-loaded microorganisms, which is generally increased by 2-4 times than a concentration of the microorganisms in general wastewater plant. Microbial powder particles have good sedimentation performance and settle quickly in the sedimentation area. A subsequent sedimentation load of a sedimentation tank is high, thus reducing occupation of the sedimentation tank.

Alternatively, in step (3), a total effective volume of the bioreactor or the biological reaction structure is 8-1000 m$^3$.

Further, in step (4), after adding the slurry into the bioreactor, the slurry is distributed uniformly in the bioreactor by any hydraulic action such as bubble disturbance caused by aeration and oxygenation, hydraulic action caused by rotation of agitator blade or water exchange caused by gravity action according to an actual situation. Continuous stirring is performed to prevent the powder carrier from settling. Hydraulic stirring is beneficial for uniformly mixing the slurry and avoiding the hardening of high-concentration slurry. The adhesion of microbial particles is greatly enhanced after adding the powder carrier.

Further, in step (4), an inert filler can also be added to the bioreactor. The inert filler is a fixed carrier with an aldehyde fiber or polyester filament as a support body and a plastic sheet as a stent. Alternatively, the inert filler is a plastic carrier which is difficult to be degraded by microorganisms, such as polypropylene granular inert materials. The advantage is to improve a concentration of sludge, increase viscosity, and be beneficial to form the biofilm.

Further, in step (5), a bacterial agent or sludge can also be added as an exogenous microorganism, and a mass ratio of the bacterial agent or the sludge to the powder carrier is 1:1-4:1. The exogenous microorganism or the original microorganism in the influent water collides with the powder carrier irregularly through a Brownian motion generated by the hydraulic action, so that the microorganism is adhered to the powder carrier with a micro pore diameter to fill the inner pore of the powder carrier. Finally, a biofilm is adhered on the surface of the powder carrier to form the biological floccules with nucleus sedimentation.

Further, the sequence of step (3) and step (5) is not unique. The powder carrier without the biofilm can be added to form the biofilm, or the powder-loaded biological floccules and the microbial agent can be added to inoculate the powder carrier without the biofilm in the bioreactor, so as to realize the microbial amplification.

Further, in step (6), the biological floccules are natural settled in the sedimentation area, or chemical settled with a flocculant. Due to the high biological viscosity of the biological floccules with nucleus sedimentation, a sludge scraping apparatus with a small angular velocity is arranged on the tank wall and bottom slope surface of the sedimentation zone, which is used for scraping the wall-adhered biological floccules and stirring the sludge settled at the bottom, so as to prevent dead mud formation and hardening.

Further, in step (6), the separator separates the powder carrier and the microorganism for reuse through physical or chemical action. The physical or chemical action can be centrifugal action, gravity effect or thermal action of combustion, and other actions that do not damage original physical characteristics of the powder carrier such as molecular structure, micropore diameter and inner surface area.

Due to the adoption of the above technical solution, the present invention has the following advantages.

The method for enhancing biochemical water treatment by the powder carrier of the present invention increases the volume load of biological treatment by screening the powder carrier, preparing the powder carrier slurry, the hydraulic stirring action, loading the microorganism on the powder carrier, wastewater treatment by biological reaction, sedimentation, recovery, etc., increases the concentration of the microorganism in the biological floccules significantly in biochemical water treatment, by adding the powder carrier, improves the removal rate of difficult-to-degrade organic substances or total organic carbon (TOC), increases the removal rate of inorganic matters, and improves the effluent water quality. Moreover, due to a heavy specific gravity, the formed biological floccules have the advantages of high sedimentation speed, good sedimentation performance, formation of compact sludge, effective retention of microorganisms in the process, promotion of biological chains extension and effective reduction of various problems caused by subsequent sludge treatment, so as to make the process more "green" and environmentally friendly. The method of the present invention can be applied to the treatment of low concentration wastewater, high concentration wastewater, and other wastewater, and is suitable for developing small-sized high-efficiency equipment for treating various intercepted wastewater.

BRIEF DESCRIPTION OF THE DRAWINGS

FIGURE is a flow chart showing a method for enhancing biochemical water treatment by a powder carrier of the present invention.

DETAILED DESCRIPTION OF THE EMBODIMENTS

FIGURE is a flow chart showing a method for enhancing biochemical water treatment by a powder carrier of the present invention. As shown in the FIGURE, the method includes the following steps.

(1) A certain amount of powder carrier to be added is selected, impurities with a large particle size is removed by a screen to obtain a screened powder carrier.

(2) A solvent is added into the screened powder carrier, the screened powder carrier is dissolved into slurry by stirring, the screened powder carrier is completely wetted and does not float upwards in lumps to obtain a soaked powder carrier slurry.

(3) The pH value of the soaked powder carrier slurry is adjusted to be neutral and added into a bioreactor or a biological reaction structure.

(4) The soaked powder carrier slurry is uniformly distributed in the bioreactor through various hydraulic agitations. Due to part of the powder carrier has good sedimentation performance, continuous stirring is required to make the slurry uniformly distributed.

(5) Microorganism in the bioreactor is loaded on an inner pore of the powder carrier and wrapped onto the surface of the powder carrier by adhesion, i.e., a biofilm is attached to the surface of the powder carrier to form biological floccules with nucleus sedimentation. A large amount of the biological floccules form powder particles loaded with the microorganism through the flocculation and adsorption activity of the microorganisms to obtain powder-loaded biological floccules.

(6) The powder-loaded biological floccules are settled in a sedimentation zone after passing through the biological reaction zone, and the powder carrier is separated from the microorganism by a separator for reuse.

The present invention is further described in combination with the embodiments.

Embodiment 1

A method for enhancing biochemical water treatment by a powder carrier includes the following steps.

(1) Wastewater quality: the pH value is 6.83-7.12, the chemical oxygen demand (COD) mass concentration is 170-210 mg/L, and the total nitrogen (TN) mass concentration is 24-35 mg/L. Diatomite is used as the powder carrier for loading microorganisms, and the process of equipment is "anaerobic-anoxic-oxic (A2/O) process+powder carrier-enhanced biochemical water treatment+sedimentation tank". The total effective volume of the equipment is 14 $m^3$, the influent flow is 1 $m^3$/h. The required dosage of 120 kg of the diatomite is calculated according to an adding concentration of 8 g/L of the powder carrier, and 120 kg of the diatomite is obtained by screening with a 300-mesh screen. The diatomite is soaked for more than 24 hours to prevent the diatomite from agglomerating and floating.

(2) Because the pH value of slurry decreases sharply when the diatomite is added, other alkaline substances such as fly ash or sodium hydroxide can be added to make the pH value of the slurry return to about 7.

(3) Soaked slurry with complete moisture absorption is put into the equipment, and diatomite powder in the slurry is uniformly distributed into the equipment through an aerating system, a refluxing device and an agitator.

(4) Because there are microorganisms in the equipment or in influent water, the microorganisms are loaded in micropores of the diatomite. Finally, a biofilm is formed on the surface of diatomite molecules to generate biological diatomite floccules by proliferation and amplification.

(5) After passing through an anoxic zone and an anoxic zone corresponding to the A2/O process, biological powder particles are finally settled in the sedimentation zone. The diatomite is separated from the microorganisms for reuse by a separator. Effluent quality after treatment: the pH value is 6.61-7.12, the COD mass concentration is 20-30 mg/L, the TN mass concentration is 3-8 mg/L.

Embodiment 2

A method for enhancing biochemical water treatment by a powder carrier includes the following steps.

(1) Wastewater quality: the pH value is 6.59-7.68, the COD mass concentration is 150-290 mg/L, and the TN mass concentration is 27-41 mg/L. Diatomite is used as the powder carrier for loading microorganism, and the process of equipment is "sequencing batch reactor (SBR) process+powder carrier-enhanced biochemical water treatment". The total effective volume of the equipment is 8 $m^3$. The required dosage of 48 kg of the diatomite is calculated according to an adding concentration of 6 g/L of the powder carrier, and 48 kg of the diatomite is obtained by screening with a 250 mesh screen.

(2) The diatomite is directly added into cylindrical equipment with the effective volume of 8 $m^3$. An agitator and an aerator are started to make the diatomite uniformly distributed in the cylindrical equipment. At the same time, the diatomite is completely wetted and there is no floating particles on the surface.

(3) The aerator and the agitator are stopped to feed water into the equipment to replace a supernatant in the equipment, so as to make the pH value in the equipment return to neutral.

(4) Because influent water in the equipment contains microorganisms or can be inoculated with microorganisms, the microorganisms are loaded in micropores of the diatomite. Finally, a biofilm is formed on the surface of diatomite molecules to generate biological diatomite particles by proliferation and amplification.

(5) Biological powder particles are subjected to a biochemical reaction, and finally flow to the sedimentation zone for sedimentation. The diatomite is separated from the microorganisms for reuse by a separator. Effluent quality after treatment: the pH value is 6.71-7.35, a COD mass concentration is 30-40 mg/L, a TN mass concentration is 9-18 mg/L.

Embodiment 3

A method for enhancing biochemical water treatment by a powder carrier includes the following steps.

(1) Wastewater quality: the pH value is 6.51-7.52, the COD mass concentration is 190-270 mg/L, and the TN mass concentration is 24-38 mg/L. Activated carbon is used as the powder carrier for loading microorganism, and the process of equipment is "anoxic-oxic (A/O) process+powder carrier-enhanced biochemical water treatment+sedimentation tank". A total effective volume of a structure is 500 $m^3$. The required dosage of 2000 kg of the activated carbon is calculated according to an adding concentration of 2 g/L of the powder carrier, and 2000 kg of the activated carbon is obtained by screening with a 250 mesh screen. The activated carbon is soaked for more than 24 hours until the activated carbon is completely wetted.

(2) The activated carbon is directly added into the structure with the effective volume of 500 $m^3$. An agitator and an aerator are started to make the activated carbon uniformly distributed in the structure. Due to the large dosage, the activated carbon can be put in multiple sites to facilitate the uniform distribution of the activated carbon.

(3) Because the activated carbon dissolving in water does not cause a drastic change of the pH value of water body, slurry can be directly added without pH value adjustment.

(4) Original microorganisms in the structure are used form a biofilm in an inner pore and an outer surface of the activated carbon, and finally powder-loaded biological floccules are formed.

(5) The powder-loaded biological floccules are subjected to a biochemical reaction, and finally flow to the sedimentation zone for sedimentation. The pore of the activated carbon is recovered by a physical action of a separator or a high-temperature calcination for reuse. Effluent quality after treatment: the pH value is 6.71-7.35, the COD mass concentration is 30-40 mg/L, the TN mass concentration is 9-18 mg/L.

Embodiment 4

A method for enhancing biochemical water treatment by a powder carrier includes the following steps.

(1) Wastewater quality: the pH is 6.71-7.72, the COD mass concentration is 160-370 mg/L, and the TN mass concentration is 24-50 mg/L. Zeolite powder is used as the powder carrier for loading microorganism, and the process of equipment is "biological contact oxidation process+powder carrier-enhanced biochemical water treatment+sedimentation tank". The total effective volume of the equipment is 30 $m^3$. The required dosage of 180 kg of the zeolite powder is calculated according to an adding concentration of 6 g/L of the powder carrier, and 180 kg of the zeolite powder is obtained by screening with a 250 mesh screen. The zeolite powder is soaked for more than 24 hours until the zeolite powder is completely wetted.

(2) The zeolite powder is directly added into the equipment with the effective volume of 30 m³. An agitator and an aerator are started to make the zeolite powder uniformly distributed in the cylindrical equipment. Due to the large dosage, the zeolite powder can be put in multiple sites to facilitate the uniform distribution of the zeolite powder.

(3) Because the zeolite powder dissolving in water does not cause a drastic change of the pH value of water body, the zeolite powder can be directly added without considering the problem of pH change after being added.

(4) The zeolite powder and an inert filler in a biological contact oxidation tank are taken as the carrier for biofilm culturing. The inert filler is a common filler in the treatment process, and a fixed carrier using aldehyde fiber or polyester filament as the support body, a plastic sheet as the stent is adopted to make the microorganisms form a biofilm and proliferate on it.

(5) Biological powder floccules wrapped with the zeolite powder are subjected to a biochemical reaction, and finally flow to the sedimentation zone for sedimentation. The pore of the zeolite powder is recovered by a physical action of a separator or a high-temperature calcination for reuse. Effluent quality after treatment: a pH value is 6.51-7.01, the COD mass concentration is 30-40 mg/L, the TN mass concentration is 12-16 mg/L.

Embodiment 5

A method for enhancing biochemical water treatment by a powder carrier includes the following steps.

(1) Wastewater quality: the pH is 6-7, the COD mass concentration is 200-300 mg/L, and the TN mass concentration is 20-35 mg/L. Fly ash is used as a powder carrier for loading microorganism, and the process of equipment is "oxidation ditch+powder carrier-enhanced biochemical water treatment+sedimentation tank". The total effective volume of the structure is 1000 m. The required dosage of 5000 kg of the fly ash is calculated according to an adding concentration of 5 g/L of the powder carrier, and 5000 kg of the fly ash is obtained by screening with a 300 mesh screen. The fly ash is soaked for more than 24 hours until the fly ash is completely wetted.

(2) Because the fly ash dissolving in water will convert the water body to be alkaline, the fly ash cannot be directly added. The fly ash needs to be prepared into slurry, and then added after the pH thereof is adjusted. A certain amount of acidic substance is added after the fly ash is dissolved in water to make fly ash slurry return to neutral.

(3) The fly ash slurry is directly added into the structure with the effective volume of 1000 m³. An agitator and an aerator are started to make the fly ash uniformly distributed in the corridor-shaped structure. Due to the large dosage, the fly ash slurry can be put in multiple sites of the loop corridor section of the oxidation ditch to facilitate the uniform distribution of the fly ash slurry.

(4) The fly ash is combined with the microorganisms in the biological oxidation ditch to make the microorganisms form a biofilm and proliferate on it, so as to form powder-loaded biological floccules.

(5) Biological powder particles wrapped with the fly ash are subjected to a biochemical reaction, and finally flow to the sedimentation zone for sedimentation. The pore of the fly ash is recovered by a physical action of a separator or a high-temperature calcination for reuse. Effluent quality after treatment: the pH value is 6-7, the COD mass concentration is 20-30 mg/L, the TN mass concentration is 4-5 mg/L. The effluent quality after treatment meets the standard of GB 8978-1996 quasi class IV surface water.

Test Example 1

The sludge sedimentation performance of the wastewater treated by the method provided by the present invention is tested, and the specific test results are shown in Table 1.

TABLE 1

Test Results of the Sludge Sedimentation Performance in the Embodiments of the Present Invention

| Sludge sedimentation performance | Embodiments | Sludge in wastewater plant |
|---|---|---|
| Mixed liquid suspended solids (MLSS) (mg/L) | 3000-20000 | 3000-6000 |
| Mixed liquid volatile suspended solids (MLVSS) (mg/L) | 2500-15000 | 1200-3600 |
| Sludge settling velocity (SV) (%) | 10-40 | 15-30 |
| Sludge volume index (SVI) (mL/g) | 100-200 | 80-150 |

According to the test results in Table 1, the method for enhancing biochemical water treatment by a powder carrier improves the sludge sedimentation performance.

The foregoing illustration and the description of the embodiments are provided to facilitate the understanding and application of the present invention by those of ordinary skills in the art. It will be apparent to those skilled in the art that various modifications may be readily made to these contents and that the generic principles described herein may be applied to other embodiments without creative effort. Accordingly, the present invention is not limited to the above related description and the description of the embodiments, in light of the disclosure of the present invention, modifications and alterations made by those skilled in the art without departing from the scope of the present invention shall fall within the scope of the present invention.

What is claimed is:

1. A method for enhancing a biochemical water treatment by a powder carrier, comprising:
   1) selecting a predetermined amount of the powder carrier to be added, removing impurities with a large particle size by a screen to obtain a screened powder carrier;
   2) adding a solvent into the screened powder carrier and stirring until the screened powder carrier is completely wetted and does not float upwards in lumps to obtain a soaked powder carrier slurry;
   3) adjusting a pH value of the soaked powder carrier slurry to be neutral, and adding the soaked powder carrier slurry into a bioreactor or a biological reaction structure;
   4) distributing the soaked powder carrier slurry uniformly in the bioreactor or the biological reaction structure through a hydraulic agitation;
   5) loading a microorganism into the bioreactor or the biological reaction structure, and through the hydraulic agitation, allowing the microorganism to fill inner pores of the screened powder carrier and form a biofilm adhered on a surface of the screened powder carrier in the soaked powder carrier slurry to obtain powder-loaded biological floccules;
   6) settling the powder-loaded biological floccules in a sedimentation zone after passing through a biological reaction zone and separating the screened powder carrier of the powder-loaded biological floccules from the microorganism of the powder-loaded biological floccules by a separator for reuse.

2. The method according to claim 1, wherein in step 1, the powder carrier is at least two selected from the group consisting of diatomite, powdered activated carbon, zeolite powder, volcanic rock powder, talc powder and fly ash.

3. The method according to claim 1, wherein the screen used in step 1 is greater than 200 mesh.

4. The method according to claim 1, wherein of the powder carrier has a particle size of 10-74 μm.

5. The method according to claim 1, wherein the powder carrier has an inner surface area of 30-70 m$^2$/g, a loss on ignition of the powder carrier is 0-40%, and a bulk density of the powder carrier is 0.1-1.0 g/m$^3$.

6. The method according to claim 1, wherein in step 2, the powder carrier is soaked in wastewater, purified water, or tap water.

7. The method according to claim 1, wherein in step 3, the pH value is adjusted by slowly replacing a supernatant of the soaked powder carrier slurry, or the pH value is adjusted by adding the soaked powder carrier slurry to a biochemical tank directly.

8. The method according to claim 1, wherein in step 3, a method of adding the soaked powder carrier slurry is as follows:
stirring the soaked powder carrier slurry by an agitation vat to obtain a diluted and wetted slurry, and adding the diluted and wetted slurry into a biochemical tank by a directional spraying device; or
after the powder carrier is stirred and wetted by the agitation vat to obtain the soaked powder carrier slurry, adding the soaked powder carrier slurry into the biochemical tank by a dry throwing machine.

9. The method according to claim 1, wherein in step 3, after the soaked powder carrier slurry is added, a concentration of the powder carrier in the bioreactor or the biological reaction structure is 2 g/L-20 g/L.

10. The method according to claim 1, wherein in step 3, a total effective volume of the bioreactor or the biological reaction structure is 8-1000 m$^3$.

11. The method according to claim 1, wherein in step 4, an inert filler is added to the bioreactor or the biological reaction structure to increase a concentration and a viscosity of the soaked powder carrier slurry, and help forming the biofilm.

12. The method according to claim 1, wherein in step 4, an inert filler is added to the bioreactor or the biological reaction structure; and
the inert filler is a fixed carrier with an aldehyde fiber or polyester filament as a support body and a plastic sheet as a stent; or the inert filler is a plastic carrier, and the plastic carrier is polypropylene granular inert materials and difficult to be degraded by the microorganism.

13. The method according to claim 1, wherein in step 5, a bacterial agent or sludge is added as the microorganism, and a mass ratio of the bacterial agent or the sludge to the soaked powder carrier slurry is (1:1)-(4:1).

14. The method according to claim 1, wherein in step 6, the powder-loaded biological floccules are natural settled in the sedimentation zone, or chemical settled with a flocculant.

15. The method according to claim 1, wherein in step 6, a sludge scraping apparatus with a small angular velocity is arranged on a tank wall and a bottom slope surface of the sedimentation zone, and the sludge scraping apparatus is configured for scraping wall-adhered biological floccules and stirring the powder-loaded biological floccules settled at a bottom of the sedimentation zone, so as to prevent dead mud formation and hardening.

16. The method according to claim 1, wherein in step 6, the screened powder carrier and the microorganism are separated by a force, and the force does not damage physical properties of the screened powder carrier.

17. The method according to claim 16, wherein the screened powder carrier and the microorganism are separated through a centrifugal action, a gravity effect, or a thermal action of combustion.

18. A method for enhancing a biochemical water treatment by a powder carrier, comprising:
1) selecting a predetermined amount of the powder carrier to be added, removing impurities with a large particle size by a screen to obtain a screened powder carrier;
2) adding the screened powder carrier directly into a bioreactor or a biological reaction structure, and soaking the screened powder carrier with s solvent in the bioreactor or the biological reaction structure until the screened powder carrier is completely wetted and does not float upwards in lumps to obtain a soaked powder carrier slurry;
3) adjusting a pH value of the soaked powder carrier slurry to be neutral;
4) distributing the soaked powder carrier slurry uniformly in the bioreactor or the biological reaction structure through a hydraulic agitation;
5) loading a microorganism into the bioreactor or the biological reaction structure, and through the hydraulic agitation, allowing the microorganism to fill inner pores of the screened powder carrier and form a biofilm adhered on a surface of the screened powder carrier in the soaked powder carrier slurry to obtain powder-loaded biological floccules;
6) settling the powder-loaded biological floccules in a sedimentation zone after passing through a biological reaction zone and separating the screened powder carrier of the powder-loaded biological floccules from the microorganism of the powder-loaded biological floccules by a separator for reuse.

* * * * *